(12) United States Patent
Barois et al.

(10) Patent No.: US 12,470,996 B2
(45) Date of Patent: Nov. 11, 2025

(54) TRANSMISSION METHOD AND NODE DEVICE IMPLEMENTING SAID METHOD

(71) Applicant: SAGEMCOM ENERGY & TELECOM SAS, Rueil Malmaison (FR)

(72) Inventors: Jérôme Barois, Rueil Malmaison (FR); Guillaume Juan, Rueil Malmaison (FR)

(73) Assignee: SAGEMCOM ENERGY & TELECOM SAS, Bois-Colombes (FR)

( * ) Notice: Subject to any disclaimer, the term of this patent is extended or adjusted under 35 U.S.C. 154(b) by 213 days.

(21) Appl. No.: 17/884,912

(22) Filed: Aug. 10, 2022

(65) Prior Publication Data

US 2023/0068028 A1    Mar. 2, 2023

(30) Foreign Application Priority Data

Aug. 26, 2021   (FR) ...................................... 2108917

(51) Int. Cl.
*H04W 40/08* (2009.01)
*H04W 40/06* (2009.01)
*H04W 40/28* (2009.01)

(52) U.S. Cl.
CPC ........... *H04W 40/08* (2013.01); *H04W 40/06* (2013.01); *H04W 40/28* (2013.01)

(58) Field of Classification Search
CPC ..... H04W 40/08; H04W 40/06; H04W 40/28; H04W 40/00; H04B 2203/5433; H04B 2203/5479; H04B 3/58
See application file for complete search history.

(56) References Cited

U.S. PATENT DOCUMENTS

| | | | |
|---|---|---|---|
| 2008/0130673 A1* | 6/2008 | Cregg | H05B 47/19 340/12.3 |
| 2013/0188670 A1* | 7/2013 | Sun | H04B 3/58 375/211 |

(Continued)

FOREIGN PATENT DOCUMENTS

WO    2015/094823 A1    6/2015

OTHER PUBLICATIONS

May 11, 2022 Search Report issued in French Patent Application No. 2108917.

(Continued)

*Primary Examiner* — Sun Jong Kim
(74) *Attorney, Agent, or Firm* — Williams Mullen; R. Brian Drozd

(57) ABSTRACT

A transmission method for transmitting a fragment of an IP packet from a first node device to a third node device through a second node device. The first and second node devices are configured for communicating by powerline and by radio frequency. The second and third node devices can communicate only using a single communication medium from powerline and radio frequency. A first fragment sent by said first node device either by powerline or by radio frequency is received. An acknowledgement message is sent by to said first node device using a second communication medium selected from powerline and radio frequency so that it is different from said single medium. Then said first fragment is transmitted to said third node device using said single communication medium.

6 Claims, 4 Drawing Sheets

(56) References Cited

U.S. PATENT DOCUMENTS

| | | |
|---|---|---|
| 2017/0187661 A1 | 6/2017 | Hui et al. |
| 2020/0084277 A1* | 3/2020 | Somaraju ............ H04L 12/2807 |
| 2020/0186197 A1* | 6/2020 | Teboulle ................ G01D 4/004 |
| 2021/0014006 A1* | 1/2021 | Duan .................... H04L 1/1812 |
| 2022/0151166 A1* | 5/2022 | Siaperas ................ A01G 23/06 |
| 2022/0182320 A1* | 6/2022 | Pei ..................... H04L 61/2514 |

OTHER PUBLICATIONS

Anil Mengi G3-PLC Alliance Germany: "Narrowband OFDM PLC specifications for G3-PLC networks; C18", ITU-T Draft; Study Period 2021-2024; Study Group 15; Series C18, International Telecommunication Union, Geneva; CH, vol. 18/15, Mar. 18, 2021 (Mar. 18, 2021), pp. 1-277, XP044307267, Retrieved from the Internet: <URL: https://www.itu.int/ifa/t/2017/sg15/docs/rgm/Q18-210308/C/T17-SG15RGM-Q18-210308-C-0018.docx> [retrieved on Mar. 18, 2021].

Nico Saputro et al. "A survey of routing protocols for smart grid communications", Computer Networks; Electrical and Computer Engineering (CCECE), 2014 IEEE 27TH Canadian Conference on. a Survey on Advanced Metering Infrastructure and Its Application in Smart Grids, Elsevier, Amster, vol. 56, No. 11, Jan. 1, 2012 (Jan. 1, 2012), pp. 2742-2771, XP009530917, ISSN: 1389-1286, DOI: 10.1016/J.COMNET.2012.03.027. Retrieved from the Internet: < URL: https://api.elsevier.com/content/article/PII:.

* cited by examiner

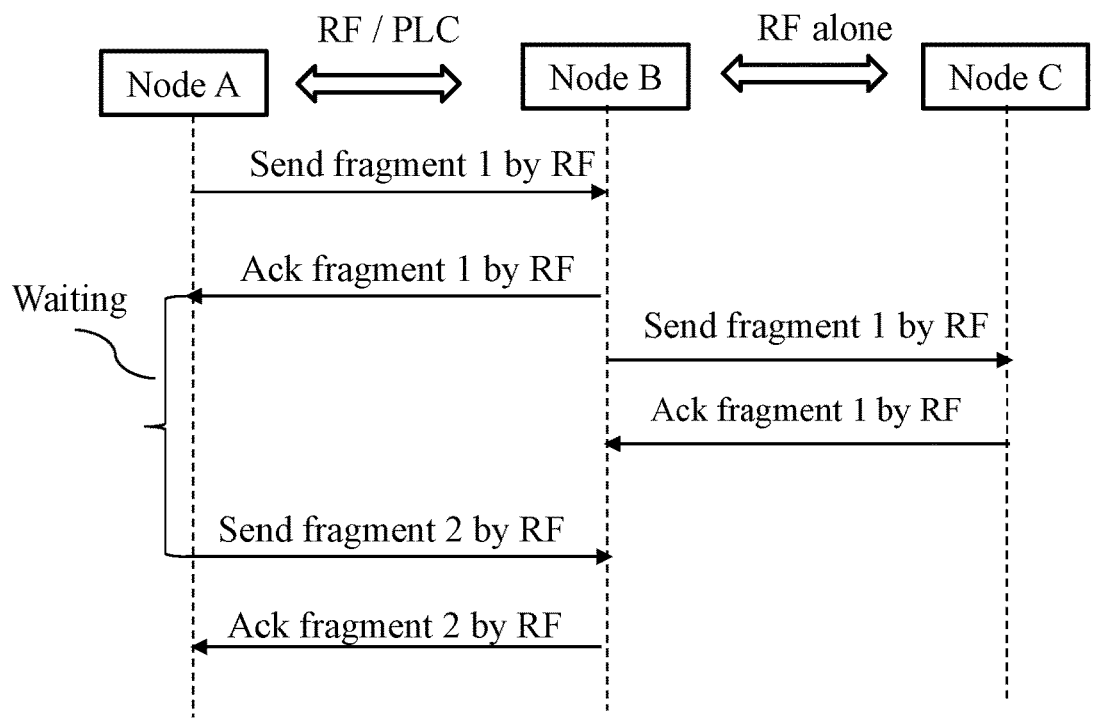
Fig. 1 – Prior art
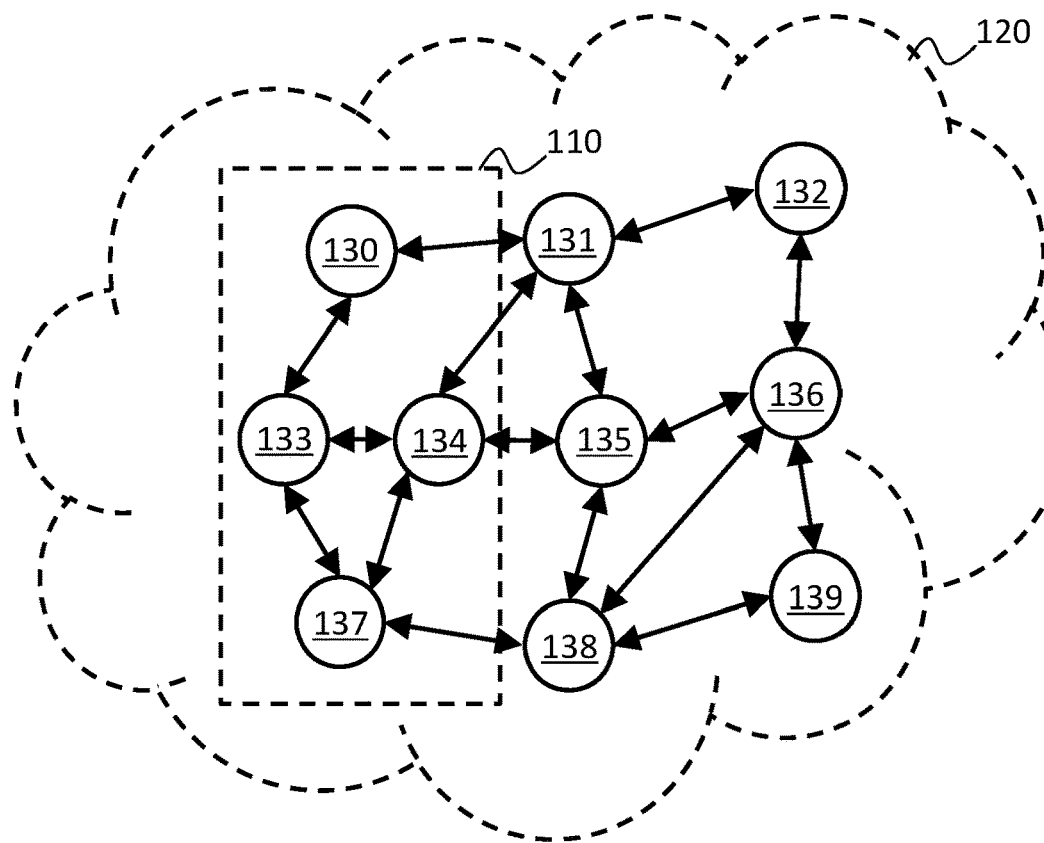
Fig. 2

TRANSMISSION METHOD AND NODE DEVICE IMPLEMENTING SAID METHOD

TECHNICAL FIELD

At least one embodiment relates to a transmission method for transmitting a fragment of an IP packet from a first node device to a third node device through a second node device belonging to a network neighbourhood of said first and second node devices. At least one embodiment relates to a node device implementing said transmission method.

PRIOR ART

Powerline communications PLC are developing, in particular in the context of electrical supply networks of the AMM type (the acronym signifying "automated meter management"). Communication networks are thus implemented in electrical supply networks for the automated collection, by a base node device (also referred to as a "data concentrator") in the network, from smart electricity meters, of energy consumption reading data that said smart electricity meters are respectively responsible for monitoring.

The G3-PLC communication standard is defined to enable the various node devices (in particular data concentrator and smart electricity meters) in such a network to communicate with each other. The standard is specified in the ITU-T recommendation G.9903, which describes in particular the physical layer (PHY) and the data link layer (DLL) of the OSI model (the acronym for "Open Systems Interconnection"). The G3-PLC standard is intended to be used in frequency bands ranging from 10 to 490 kHz. It supports more particularly the following frequency bands: the CENELEC A frequency band, which ranges approximately from 35 kHz to 91 kHz; the FCC frequency band, which ranges approximately from 150 kHz to 480 kHz; the ARM frequency band, which ranges approximately from 150 kHz to 400 kHz; and the CENELEC B frequency band, which ranges approximately from 98 kHz to 122 kHz. These various frequency bands have different characteristics in terms of bit rate, range and resistance to disturbances, in particular.

In a development of the G3-PLC standard defined in an Annex H of the ITU-T recommendation G.9903 (2017) Amendment 1 (05/2021), called G3-PLC Hybrid PLC & RF, an RF (the acronym for radio-frequency) channel can be used in place of one of said PLC frequency bands. More precisely, this version of the standard allows the occasional use of a secondary radio physical layer based on an SUN FSK modulation as defined in IEEE 802.15.4:2015. Thus, by using the various G3-PL and RF media for transmitting data, the electrical supply network maximises its coverage and its resilience. An electrical-supply network node device capable of sending and receiving data using the two media (PLC and RF) is called a hybrid node.

However, in G3-PLC Hybrid PLC & RF, the choice of communicating between two hybrid nodes of the communication network either by powerline on a PLC frequency band or by radio frequency on an RF channel is determined at the time of construction or reconstruction of the communication routes. This choice of the communication medium used between two hybrid nodes in the network is generally fixed for several hours. Thus the unicast messages are transmitted between said two hybrid nodes during this period either on a PLC frequency band or on an RF channel according to the choice made at the time of construction or reconstruction of the route.

FIG. 1 illustrates schematically a method for transmitting fragments of an IP packet according to the prior art. The node devices A and B are hybrid nodes that can therefore communicate either by PLC or by RF. The node device C, for its part, can communicate with the node device B only by RF. On FIG. 1, the node device A sends a first IP fragment (fragment 1) to the node device B by radio frequency. For example, when the route was constructed, it was decided that A and B communicate by RF even if they also had the ability to communicate by PLC. In return, the node device B sends an acknowledgement message to the node device A using the same communication medium as the one on which it received the fragment 1. The node device B also transmits the fragment 1 to the node device C and in return receives an acknowledgement message by radio frequency. Consequently the node device A must wait before it is able to send the fragment 2 since the RF channel is already occupied for the exchanges of the fragment 1 and of the acknowledgement message between the node devices B and C. Thus significant latency exists in the transmission of the fragments of an IP packet.

It is desirable to overcome these various drawbacks of the prior art. It is in particular desirable to propose a method for transmitting fragments of IP packets between node devices in an electrical supply network that reduces the delay, i.e. the latency, in transmitting IP packet fragments between node devices in said network.

DISCLOSURE OF THE INVENTION

At least one embodiment relates to a transmission method for transmitting a fragment of an IP packet from a first node device to a third node device through a second node device belonging to a network neighbourhood of said first and third node devices. The first, second and third node devices belong to an electrical supply network. The first and second node devices are configured for communicating by powerline and by radio frequency whereas the second and third node devices can communicate only using a single communication medium (which may for example be the powerline in the case where the maximum threshold of use of the radio frequencies is momentarily reached), referred to as the first medium, among powerline and radio frequency.

The transmission method comprises the following steps performed by the second node device:

receiving a first fragment sent by said first node device either by powerline or by radio frequency; and sending an acknowledgement message to said first node device using a second communication medium selected from powerline and radio frequencies so that it is different from said first medium (unless this would involve choosing radio frequency whereas the maximum threshold of use of radio frequency is reached); and transmitting said first fragment to said third node device using said first communication medium.

The transmission method allows an alternation of communication medium between successive pairs of node devices. Thus the latency time for transmitting fragments of IP packets is reduced.

In a particular embodiment, the transmission method further comprises the following step performed by the first node device:

transmitting to said second node device the fragments of the IP packet following said first fragment using solely said second communication medium (unless this would involve selecting radio frequencies whereas the maximum threshold of use of the radio frequencies is reached).

In a particular embodiment, said IP packet is fragmented in accordance with the 6LowPAN protocol.

In a particular embodiment, in the case where a fragment of the IP packet is transmitted by powerline, said fragment is transmitted on at least one frequency band belonging to a set of frequency bands comprising:

the CENELEC A frequency band;
the CENELEC B frequency band; and
the FCC frequency band or the ARM frequency band.

In a particular embodiment, in the case where the fragment of the IP packet is transmitted by radio frequency, said fragment is transmitted on a frequency band ranging from 863 MHz to 870 MHz.

An intermediate node device between a first node device and a second node device is also described. The intermediate node device and said second and third node devices belong to an electrical supply network. The intermediate node device belongs to a network neighbourhood of said first and second node devices. The first node device and the intermediate node are configured for communicating by powerline and by radio frequency. The second node device and the intermediate node device can communicate only by using a single communication medium, referred to as the first medium, from powerline and radio frequency. The intermediate node device comprises:

means for receiving a first fragment sent by said first node device either by powerline or by radio frequency; and
means for sending an acknowledgement message to said first node device using a second communication medium selected from powerline and radio frequency so that it is different from said first medium; and
means for transmitting said first fragment to said second node device using said first medium.

A computer program product is described that comprises instructions for implementing the transmission method according to one of the preceding embodiments, when said program is executed by a processor.

A storage medium is also described that stores a computer program comprising instructions for implementing the transmission method according to one of the preceding embodiments, when said program is executed by a processor.

BRIEF DESCRIPTION OF THE DRAWINGS

The features of the invention mentioned above, as well as others, will emerge more clearly from the reading of the following description of an example embodiment, said description being made in relation to the accompanying drawings, among which:

FIG. 1 illustrates schematically a method for transmitting fragments of an IP packet according to the prior art;

FIG. 2 illustrates schematically a mesh communication network;

DETAILED DISCLOSURE OF EMBODIMENTS

Figure 3:
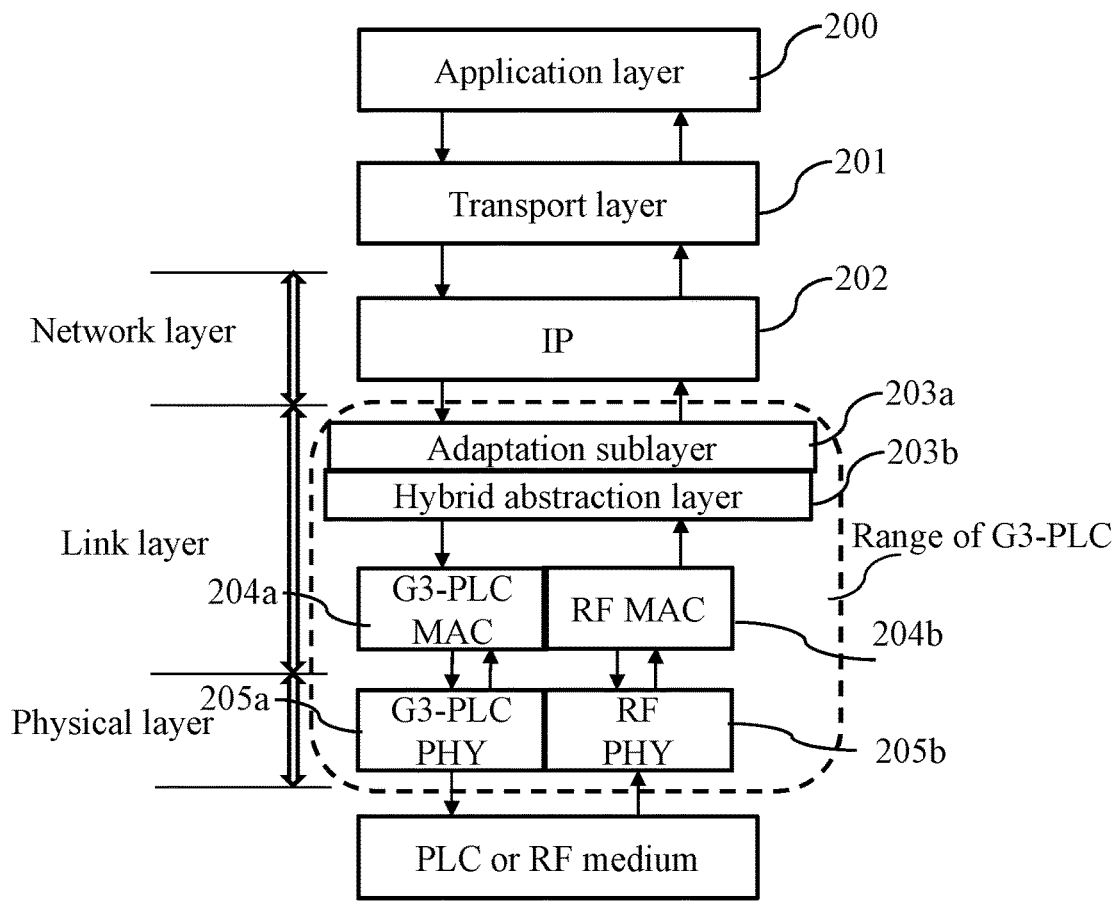
FIG. 3 illustrates schematically the various layers of an OSI model in the particular case of the G3-PLC Hybrid PLC and RF standard.

FIG. 1 illustrates schematically a mesh communication network 120. The mesh communication network 120 is for example an electrical supply network of the AMM type. The mesh communication network 120 relies on powerline communications PLC or radio-frequency RF communications for enabling a base node device (also called a "data concentrator") to collect, from smart electricity meters, energy consumption reading data from electrical installations that said smart electricity meters are respectively responsible for monitoring. The data concentrator and the smart electricity meters are thus node devices of the mesh communication network 120. The mesh communication network 120 may comprise other node devices, for example installed at electrical transformers. The communication network 120 therefore has a mesh structure, as shown schematically on FIG. 1 by means of arrows, where node devices fulfil the role of relays for increasing the range of communications in the mesh communication network 120, as detailed below. Thus one and the same smart electricity meter potentially has available several paths for reaching the data concentrator, and vice versa. In the remainder of the document, the terms "smart electricity meter" and "meter" are used interchangeably.

The present invention is thus particularly adapted to the context of G3-PLC Hybrid PLC & RF technology as defined in the ITU-T recommendation G.9903 (2017) Amendment 1 (05/2021) and more particularly in Annex H.

The mesh communication network 120 thus comprises a plurality of node devices 130, 131, 132, 133, 134, 135, 136, 137, 138, 139. A network neighbourhood is associated with each node device in the mesh communication network 120. On FIG. 1, the node device 133 is associated with a network neighbourhood 110 encompassing node devices 130, 134 and 137. This is because, in the mesh communication network 120, a signal or a message broadcast by a node device (such as the node device 133) is in general not visible at every point in said communication network. Each node device sending signals or messages then has a network neighbourhood, i.e. a subset of said mesh communication network 120 wherein any node device can intelligibly receive said signals or messages directly coming from the node device that broadcast said signals or messages. The network neighbourhood corresponds to the range of the signals sent, according to predetermined transmission parameters (e.g. power, modulation and coding scheme, network topology, etc.) of the node device at the source of said signals and also potentially according to characteristics of the communication channel (attenuation, noise, impedance, etc.).

The mesh communication network 120 relies on a routing protocol of the reactive type, such as the LOADng protocol ("Lightweight On-demand Ad hoc Distance-vector Routing Protocol—Next Generation"). Unlike the routing protocols of the proactive type, which rely on a global knowledge of network topology, the routing protocols of the reactive type rely on on-demand route discoveries, each node device in the network then needing solely to have knowledge of its own network neighbourhood to route data in the mesh communication network 120.

To discover a suitable route in the mesh communication network 120 from a source node device (for example the node device 133) to a destination node device (for example the node device 132), it is known that the source node device broadcasts a route discovery request, called RREQ ("Route REQuest"). In the G3-PLC Hybrid PLC & RF case, the RREQ request is broadcast on the two media PLC and RF. This route discovery request is received by each node device in the network neighbourhood of said source node device. Each node device in the network neighbourhood of said source node device relays said request by broadcasting if said node device in question is not the destination node device. By gradual broadcasting, a plurality of route discovery requests are typically received by the destination node device, each of these requests having followed a different path in the mesh communication network 120.

Each node device that originates a message, such as for example a route discovery request, includes therein an identifier that is particular to it, as well as a sequence number, as defined in the LOADng protocol. This sequence number is a counter value particular to each node device in the mesh communication network 120. Each time that a node device generates a new message, said node device increments its counter and includes in the message in question the value of said counter. Thus, when a node device receives a message, said node device analyses the identifier of the node device originating the message and the sequence number included in the message, and can determine whether the message received is actually a new message or a new copy of a message already received. Each node device can however decide not to relay a route discovery request when one or more criteria are not met. In particular, before deciding to relay said request, the node device in question typically checks whether said request comprises information representing a route cost, from the source node device to the node device in question, which is better than the route cost represented by information contained in another route discovery request previously received by the node device in question. In other words, the node device in question relays, by broadcasting, said request if said request relates to a path that has followed, from the source node device to the node device in question, a pathway with a lower cost than any other request previously received by the node device in question (and therefore for the same route discovery).

The cost of a route may rely on one or more metrics. For example, the route cost is a number of hops undergone by the request in question from the source node device. According to another example, the route cost is the result of a calculation that depends on the bandwidth of the links crossed, by the request in question, from the source node device and/or on the quality of the communication links. According to yet another example, the route cost is proportional to the latency undergone by the request in question from the source node device. Other metrics can be used for establishing a route cost, i.e. a transit cost, from the source node device to the destination node device. According to yet another example, the route cost also depends on the medium, i.e. radio or PLC, used for transmitting the data between two successive nodes.

When a node device decides to relay, by broadcasting, a route discovery request, the node device in question updates the route cost information contained in said request, so as to take into account the fact that said request is passed by the node device in question. Thus, according to such a principle, a plurality of route discovery requests typically arrive at the destination node device, each comprising information on the cost of the route that said request followed to be propagated from the source node device to the destination node device. The pathway followed by said route discovery request associated with the best route cost is next selected to enable the source node device to transmit data to the destination node device. To activate the route in question, the destination node device transmits a route discovery reply, called RREP ("Route REPly"). This route discovery reply is transmitted gradually by following the path that is the reverse of the route discovery request that was associated with the best route cost. Each node device receiving the route discovery reply updates an internal routing table, at the data link layer DLL, in order to indicate therein that any subsequent message transmitted in unicast mode from the source node device in question to the destination node device in question must be transmitted or relayed to such and such a node device of its network neighbourhood. Within the link layer, the routing tables are preferentially implemented in an adaptation sublayer responsible for implementing the routing protocol in the communication network. For example, this adaptation sublayer is in accordance with the 6LoWPAN protocol (standing for "IPv6 over Low power Wireless Personal Area Networks"), which was initially developed for supporting IPv6 in the context of IEEE 802.15.4. It should be noted that the 6LoWPAN protocol itself relies on the routing protocol of the aforementioned reactive LOADng type. A hybrid abstraction layer provides suitable services to the adaptation sublayer with a view to sending/receiving data to/from the appropriate MAC ("Medium Access Control") sublayer, i.e. RF or PLC.

By means of the routing tables thus configured, unicast communications can be made by any pair of node devices in the mesh communication network 120. Intermediate node devices therefore serve as relays when the node devices in said pair are not in the network neighbourhood of each other, and the communications thus take place gradually, each node device relying on one of its own neighbours to convey messages to their respective destinations.

To communicate between neighbouring node devices (i.e. node devices that are in the network neighbourhood of each other), the messages are transmitted in the form of modulated frames. When a modulated frame is specifically addressed to a neighbouring node device and is correctly demodulated by it, said neighbouring node device retransmits an acknowledgement ACK to the node device that sent it said modulated frame on the frequency band or the RF channel on which the modulated frame was sent.

A plurality of frequency bands and at least one RF channel are defined for supporting the transmission of these modulated frames, an adapted modulation scheme being associated with each of these frequency bands and with the RF channel. Each frame transmitted in the form of modulated signals begins with a preamble predefined according to the modulation scheme according to which said signals were modulated. The preamble is adapted for making it possible to synchronise in reception on said frame, i.e. being able to determine an actual instant of start of frame. To do this, the preamble typically comprises a plurality of successive copies of the same symbol. The actual content and the duration of the preamble are thus predefined and depend on the modulation scheme used. The preambles of several frames are identical when the same modulation scheme is applied, and different otherwise. In the remainder of the document, to alleviate the text, the term "frequency band" is used indifferently for designating a PLC frequency band or an RF channel. The modulation schemes (and corresponding demodulation schemes) applicable are preferentially multi-carrier modulation schemes (and respectively demodulation schemes) of the OFDM type ("Orthogonal Frequency Division Multiplex") in PLC or SUN-FSK (the English acronym for Smart Utility Network—Frequency Shift Keying) in RF.

In terms of frequency bands that can be used in the context of the implementation of the mesh communication network 120, mention can be made of: the CENELEC A frequency band, which ranges approximately from 35 kHz to 91 kHz; the FCC frequency band, which ranges approximately from 150 kHz to 480 kHz; the ARIB frequency band, which ranges approximately from 150 kHz to 400 kHz; and the CENELEC B frequency band, which ranges approximately from 98 kHz to 122 kHz and the RF radio channel that ranges approximately from 863 MHz to 870 MHz. It is then possible to use: a first thirty-six carrier modulation scheme in the CENELEC A frequency band; a second seventy-two carrier modulation scheme in the FCC frequency band; a third fifty-four carrier modulation scheme in the ARIB frequency band; a fourth sixteen carrier modulation scheme in the CENELEC B frequency band and a fifth modulation scheme of the SUN-FSK type for the RF radio channel of G3-PLC Hybrid PLC & RF. The SUN-FSK modulation is defined in section 20 of the document IEEE 802.15.4:2015.

FIG. 2 illustrates schematically the various layers of an OSI model in the particular case of the G3-PLC Hybrid PLC & RF standard as defined in Annex H of the ITU-T recommendation G.9903 (2017) Amendment 1 (05/2021).

A message to be transmitted coming from an application layer 200 is transmitted to a transport layer 201. The transport layer 201 contains all the protocols responsible for managing errors and controlling the network flows. The two main protocols used are the TCP and UDP protocols. The transport layer 201 creates packets by adding headers to the data coming from the application layer 200. The packets are next transmitted to an IP 202 layer, e.g. IPv6. The IP 202 layer encapsulates the packets coming from the transport layer 201 by adding in particular an IP header, e.g. IPv6. An IPv6 packet can do up to 1400 bytes. In the case where the packet has a size above a threshold value, this packet is fragmented into at least two fragments in order to adapt it to the constraints of a MAC sublayer 204a or 204b, in particular to the size of the MAC frames.

For this purpose, the G3-PLC Hybrid PLC & RF standard incorporates the 6LoWPAN protocol, which makes it possible to adapt IPv6 data packets to the constraints of the MAC sublayers 204a or 204b, in particular by fragmenting them. This is because the MAC frames used are of much smaller sizes (400 bytes maximum available per packet for the IP part) than the IPv6 packets of 1400 bytes.

An adaptation sublayer 203a incorporating the 6LoWPAN protocol and located between the IP network layer 202 and the MAC sublayer 204a or 204b of the OSI model receives from the IP network layer 202 IPv6 packets of 1280 bytes and where applicable fragments them. Naturally, in the case of an IP packet that is sufficiently small to be contained in a single G3-PLC MAC or RF MAC frame, no fragmentation is done.

A hybrid abstraction layer 203b next transfers the fragment or the IP packet in the case of absence of fragmentation to the appropriate MAC sublayer 204a or 204b according to the medium selected for transmission thereof. Hereinafter, the term fragment is used for designating both a fragment obtained from a fragmented IP packet or the IP packet itself in the case of absence of fragmentation.

The transmission of a fragment on the PLC medium, i.e. on the current line, conventionally comprises various steps, in particular a segmentation of the fragments in order to adapt them to the G3-PLC PHY physical layer 205a and an OFDM modulation of the signal. The segmentation consists of partitioning a MAC frame into PSDUs (the English acronym for "PHY Service Data Unit"). All the PSDUs coming from one and the same fragment are modulated using the same modulation scheme.

The transmission of a fragment by radio frequency over the RF radio channel comprises various steps, in particular a segmentation of the fragments in order to adapt them to the RF PHY physical layer 205b and a SUN-FSK modulation of the signal. As in the PLC case, the segmentation consists of partitioning a MAC (the English acronym for "Media Access Control") frame into PSDUs (the English acronym for "PHY Service Data Unit"). All the PSDUs coming from one and the same fragment are modulated using the same modulation scheme. The specification of the RF PHY physical layer 205b is given in sections 10, 11 and 20 of IEEE 802.15.4-2015 as amended by the document IEEE 802.15.4v: 2017 and supplemented by Table H-5-1 of the ITU-T recommendation G.9903 (2017) Amendment 1 (05/2021).

Figure 4:
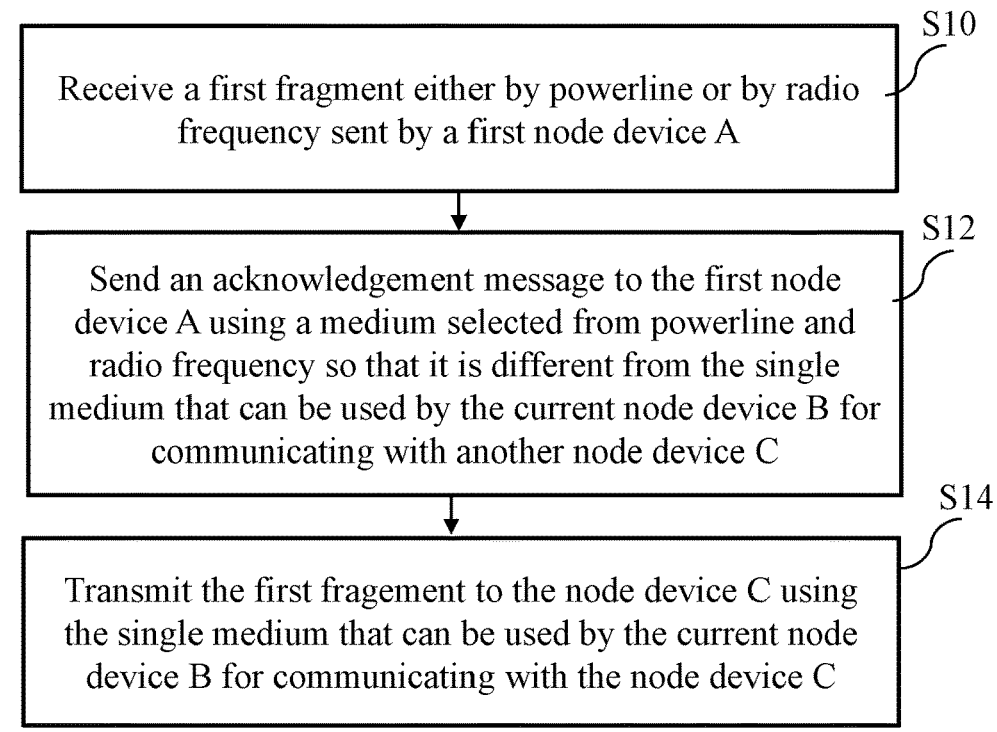
FIG. 4 illustrates schematically a method for transmitting fragments of an IP packet according to a particular embodiment.

It should be noted that the G3-PLC Hybrid PLC & RF standard imposes on each node device constraints on the time of use, on a sliding time window, of transmission by radio frequency. These constraints are defined in Table H.6.8 of annex H. For this purpose, the following values are defined for each node device:

- macDutyCyclePeriod_RF: a first predetermined value that defines a duration, e.g. in seconds, of the sliding time window (for example, macDutyCyclePeriod_RF=3600 s);
- macDutyCycleLimit_RF: a second predetermined value that defines an absolute time limit, e.g. in seconds, of authorised time of use of transmission by radio frequency on the sliding time window (for example, macDutyCycleLimit_RF=90 s for the meters and macDutyCycleLimit_RF=360 s for the data concentrator);
- macDutyCycleThreshold_RF: a third predetermined value that defines a maximum threshold of time of use authorised for transmission by radio frequency beyond which any transmission by radio frequency is interrupted, e.g. expressed as percents (for example, macDutyCycleThreshold_RF=90%, which means that the transmissions by radio frequency are stopped when 90% of 90 seconds out of the last 3600 seconds is reached for the meters, or 90% out of 360 seconds out of the 3600 last seconds for the data concentrator);
- macDutyCycleUsage_RF: a degree of use of the transmission by radio frequency. This degree of use is calculated on the sliding window with respect to the second predetermined value, i.e. macDutyCycleLimit_RF. The ITU-T recommendation G.9903 (2017) Amendment 1 (05/2021) indicates in table H.6.8 that macDutyCycleUsage_RF=tps/macDutyCycleLimit_RF*100 where tps is the total current time of use of the transmission by radio frequency on the sliding time window by the node device. This degree of use is for example updated after each transmission by radio frequency. FIG. 4 illustrates schematically a method for transmitting a fragment of an IP packet according to a particular embodiment. In this embodiment, the IP packet to be transmitted is fragmented in accordance with the 6LoWPAN protocol since it is too long to be able to be contained in a single MAC frame. The transmission method is implemented in a node device B intermediate between a node device A and a node device C. The node devices A and B can communicate by PLC and by RF whereas the node devices B and C can communicate, at least in a transient manner, only by using a single communication medium, e.g. radio frequency. In one example embodiment, the node devices B and C can communicate continuously only by using a single communication medium, e.g. radio frequency, since they are not connected by a PLC link. In another example embodiment, the node devices B and C can communicate using the two communication media but transiently can communicate only using a single communication medium, e.g. powerline. This is particularly the case if the degree of use of the transmission by macDutyCycleUsage_RF radio frequency has reached the macDutyCycleThreshold_RF threshold. In the latter case, communication by radio frequency is prohibited to them. In other words, they can communicate transiently, i.e. as long as the degree of use of the transmission by macDutyCycleUsage_RF radio frequency is above or equal to the macDutyCycleThreshold_RF threshold, only by using powerline.

During a step S10, the node device B receives a first fragment transmitted by the node device A using either powerline or radio frequency.

In a step S12, the node device B sends an acknowledgement message to the node device A using a medium selected from powerline and radio frequency so that it is different from the single medium that can be used by the node device B for communicating with the node device C. Thus the medium used for sending the acknowledgement message is selected independently of the medium used for transmitting the first fragment from A to B.

In a particular embodiment, account is taken of the constraint on the radio-frequency communications and more particularly account is taken of the maximum threshold of use of radio frequency. Thus, when the single medium that can be used by the node device B for communicating with the node device C is the PLC medium, then the medium selected at the step S12 is the RF medium. In the particular case where the maximum threshold of use of radio frequency is reached, i.e. macDutyCycleUsage_RF≥macDutyCycleThreshold_RF, then the step S12 is not performed. In other words, the node device B sends an acknowledgement message to the node device A using the PLC medium and not the selected RF medium.

In a step S14, the node device B transmits the first fragment to the node device C using said first medium.

Figure 5:
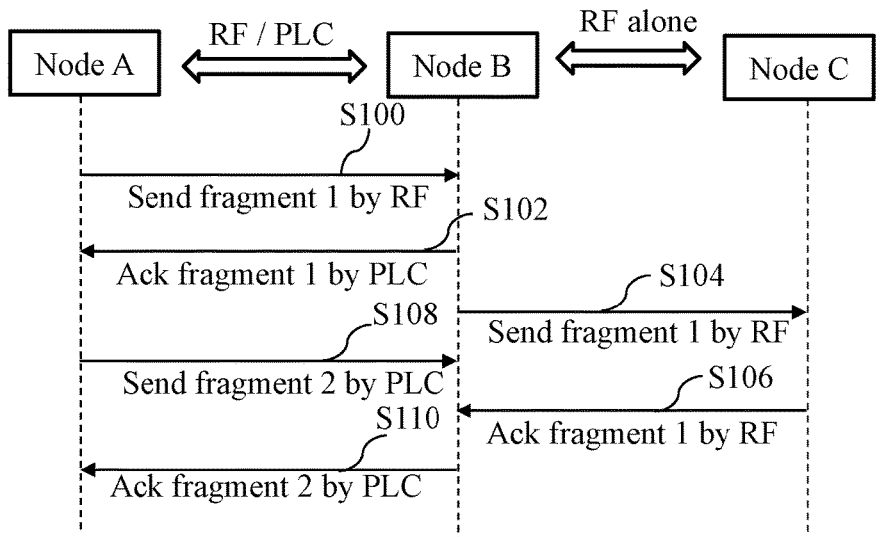
FIG. 5 illustrates schematically a method for transmitting fragments of an IP packet according to a particular embodiment.

FIG. 5 illustrates schematically a method for transmitting a fragment of an IP packet according to a particular embodiment. In this embodiment, the IP packet to be transmitted is fragmented in accordance with the 6LoWPAN protocol since it is too long to be able to be contained in a single MAC frame. The node devices A and B can communicate by PLC or by RF whereas the node devices B and C can communicate, at least transiently, only by using a single communication medium, e.g. radio frequency.

In a step S100, the node device A transmits a first fragment, denoted fragment 1, of the IP packet to the node device B using for example radio frequency. This fragment is received by the node device B.

In a step S102, the node device B in return sends an acknowledgement message to the node device A to indicate to it that it has well received the first fragment. In the prior art, the acknowledgement message is sent using the same communication medium as the one used for transmitting the fragment. According to the prior art, the acknowledgement message would be transmitted by radio frequency.

In the present embodiment, the node device B on the contrary sends an acknowledgement message using a medium different from the one used for communicating with the node device C. Thus the medium used for transmitting the acknowledgement message is independent of the medium used for sending the first fragment. In the present case, the node device B receives the first fragment transmitted by radio frequency and sends an acknowledgement message by powerline. The acknowledgement message is received by the node device A.

Subsequently the node device A transmits all the next fragments of the IP packet using solely the medium on which it received the acknowledgement. In the present case, the node device A will send the next fragments to the node device B by powerline.

In a step S104, the node device B transmits the fragment 1 to the node device C by RF since it is the only communication medium possible between the node devices B and C. In a step S106, the node device C sends an acknowledgement message to the node device B by radio frequency.

In a step S108, the node device A transmits a second fragment, denoted fragment 2, to the node device B. To do this, it does not need to wait for the RF channel used by B and C for transmitting the fragment 1 and the associated acknowledgement message to be released. The latency for transmitting the IP packet is therefore reduced. This is because the node device A, by using, for transmitting the next fragments, the same medium as the one used by the node device B for transmitting the acknowledgement message, is certain to use a medium different from the one used between the node devices B and C. There is therefore no longer any conflict in the transmission.

In a step S110, the node device B sends an acknowledgement message to the node device A still using the medium different from the one used for communicating with the node device C, i.e. powerline in the case of FIG. 4. It should be noted that step S104 can take place before or after the steps S108 and S110 or between these two steps.

Figure 6:
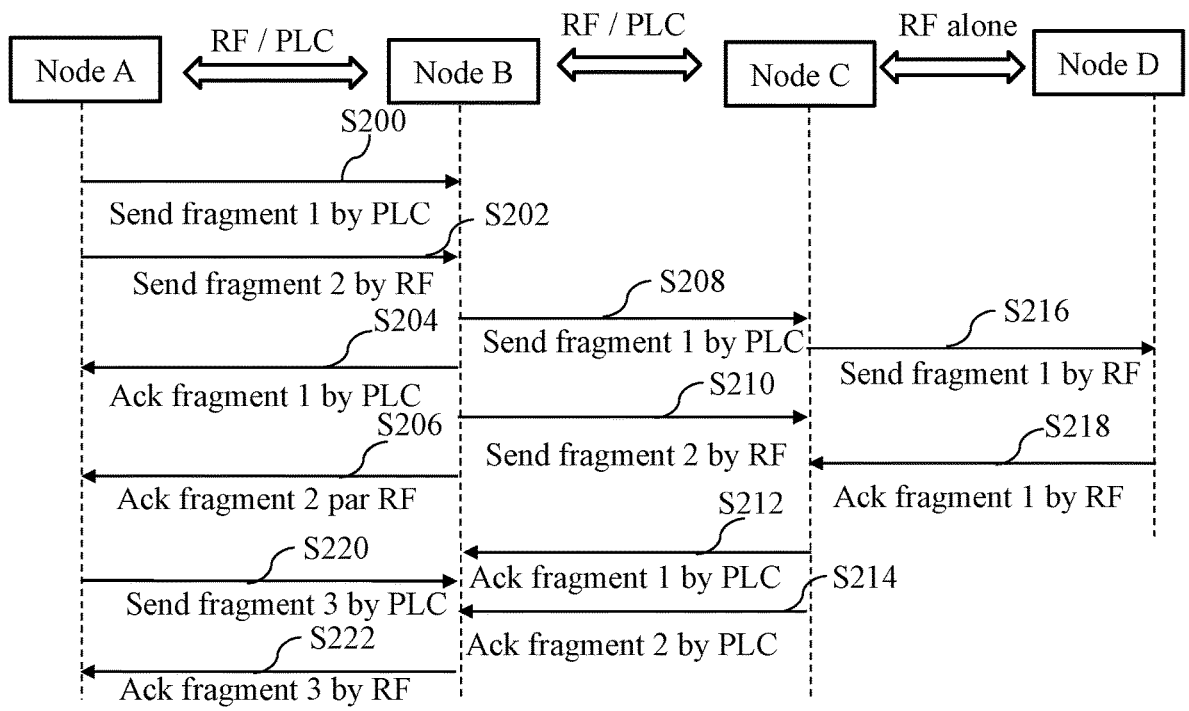
FIG. 6 illustrates schematically a method for transmitting fragments of an IP packet according to a particular embodiment.

FIG. 6 illustrates schematically a method for transmitting a fragment of an IP packet according to a particular embodiment. In this embodiment, the IP packet to be transmitted is fragmented in accordance with the 6LoWPAN protocol since it is too long to be able to be contained in a single MAC frame. The node devices A and B can communicate either by PLC or by RF, the node devices B and C can communicate either by PLC or by RF and the node devices C and D can communicate, at least transiently, only using a single communication medium, e.g. RF.

In a step S200, the node device A transmits a first fragment, denoted fragment 1, of the IP packet to the node device B using one of the two communication media, e.g. powerline in the case of FIG. 6.

In a step S202, the node device A transmits, without awaiting reception of an acknowledgement message, a second fragment, denoted fragment 2, of the IP packet to the node device B using the other one of the two communication media, e.g. radio frequency in the case of FIG. 6.

In a step S204, the node device B sends a first acknowledgement message as in the prior art, i.e. using the same medium as the one used by the node device A for transmitting the fragment 1, i.e. powerline in the case of FIG. 6.

In a step S206, the node device B sends a second acknowledgement message as in the prior art, i.e. using the same medium as the one used by the node device A for transmitting the fragment 2, i.e. radio frequency in the case of FIG. 6.

In a step S208, the node device B transmits the fragment 1 to the node device C. On FIG. 6, it transmits the fragment 1 by powerline.

In a step S210, the node device B transmits the fragment 2 to the node device C. On FIG. 6, it transmits the fragment 2 by radio frequency.

The node device C cannot communicate with the node device D except by using radio frequency, and the node device C will therefore send acknowledgement messages to the node device B using a medium that is different from the one that it necessarily uses for communicating with the node device D. In the example in FIG. 5, in a step S212, the node device C sends, following reception of the fragment 1, a first acknowledgement to the node device B by powerline. Likewise, in a step S214, the node device C sends, following the reception of the fragment 2, a second acknowledgement message to the node device B by powerline. Thus, even if the second fragment is received transmitted by B to C by radio frequency, the second acknowledgement message is sent by C to B by powerline. Thus the node device C informs the node device B that it should send the next fragment to it by powerline by sending acknowledgement messages solely by powerline.

In a step S216, the node device C sends the fragment 1 to the node device D by radio frequency. In a step S218, the node device D in its turn sends an acknowledgement message to the node device C to indicate to it that it has indeed received the fragment 1. In a step S220, the node device A transmits a third fragment, denoted fragment 3, of the IP packet to the node device B using one of the two communication media, e.g. powerline in the case of FIG. 6.

In a step S222, the node device B sends an acknowledgement message no longer as in the prior art but using a medium different from the one that it uses for communicating with the node device C. Thus, in the case of FIG. 6, the node device B sends an acknowledgement message to the node device A by radio frequency.

In its turn, the node device B signals to the node device A to send to it the next fragments on a medium different from the one used between B and C. Naturally, the fragment 2 is also transmitted from C to D and the fragment 3 is also transmitted from B to C and from C to D, even if these steps are not shown on FIG. 6.

Figure 7:
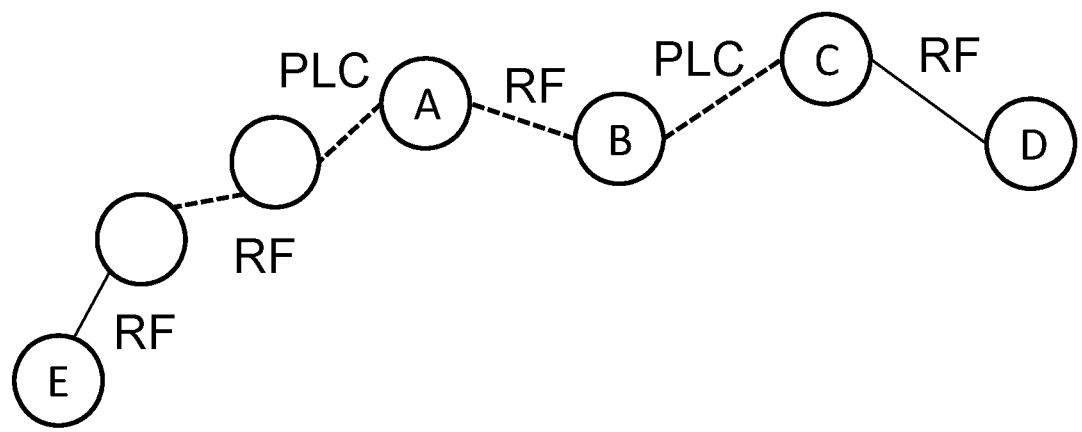
FIG. 7 illustrates schematically a branch of a mesh communication network.

Thus, completely automatically, the transmission scheme is adapted for reducing the latency time. More precisely, the transmission scheme is adapted so that there exists an alternation of communication medium between pairs of successive node devices. Thus, with reference to FIG. 6, radio frequency is used for communicating between A and B, powerline is used between B and C and radio frequency is used for communicating between C and D. Since the node device D is not a hybrid node, it has the possibility of using only one communication medium. It is therefore the node device D that determines this alternation. In other words, the choice of the communication medium is propagated gradually from the node device D to the node device A by means of the transmission of the acknowledgement messages on a suitable medium. Naturally, as soon as a node device E upstream of the node device A is not a hybrid node and can therefore transmit or receive messages only on a single medium, the propagation of the choice of the communication medium is interrupted. The transmission time is all the same accelerated on the portion of the path lying between the node device D and this node device E as illustrated on FIG. 7. On FIG. 7, the node device E can communicate only by radio frequency. On this figure, the communication links in solid lines indicate that only one communication medium can be used and the broken lines indicate that both communication media can be used. In the latter case, the selection of one of the two media is made according to the method described previously with reference to FIGS. 4 to 6.

In a particular embodiment, in implementing the methods described with reference to FIGS. 5 and 6, account is taken of the constraint on the communications by radio frequency and more particularly account is taken of the maximum threshold of use of radio frequency, as described previously with reference to FIG. 4.

Figure 8:
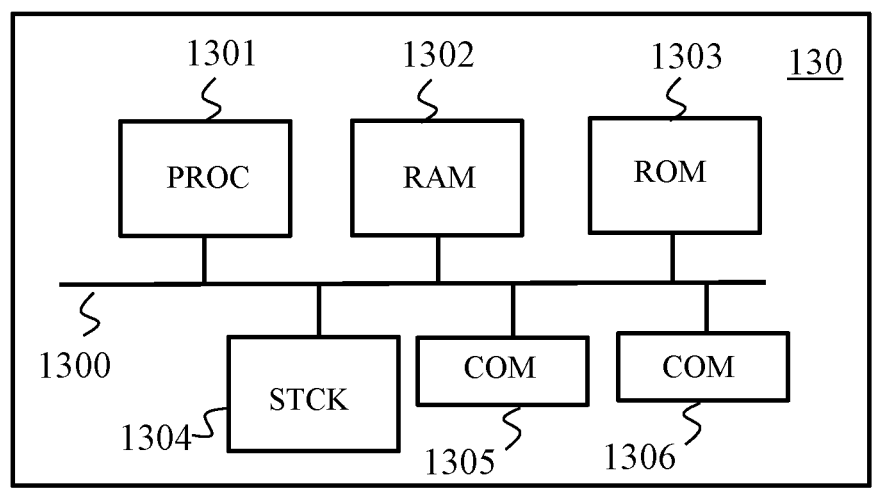
FIG. 8 illustrates schematically an example of hardware architecture of a node device of the mesh communication network according to a particular embodiment.

FIG. 8 illustrates schematically an example of hardware architecture of a node device 130 of the mesh communication network 120 according to one embodiment. Such a node device 130 is for example a meter or a data concentrator.

According to the example of hardware architecture shown in FIG. 8, the node device 130 then comprises, connected by a communication bus 1300: a processor or CPU (central processing unit) 1301; a random access memory RAM 1302; a read only memory ROM 1303; a storage unit 1304 such as a hard disk or such as a storage medium reader, e.g. an SD (Secure Digital) card reader; at least one first communication interface 1305 enabling the node device 130 to communicate with the node devices belonging to its network neighbourhood, e.g. the node devices 131 and 133, by powerline, and at least one second communication interface 1306 enabling the node device 130 to communicate with the node devices belonging to its network neighbourhood by radio frequency.

The processor 1301 is capable of executing instructions loaded in the RAM 1302 from the ROM 1303, from an external memory (not shown), from a storage medium (such as an SD card, or from a communication network. When the node device is powered up, the processor 1301 is capable of reading instructions from the RAM 1302 and executing them. These instructions form a computer program causing the implementation, by the processor 1301, of all or some of the methods described in relation to FIGS. 4 to 6.

The methods described below in relation to FIGS. 4 to 6 can be implemented in software form by executing a set of instructions by a programmable machine, for example a DSP (Digital Signal Processor) or a microcontroller, or be implemented in hardware form by a machine or a dedicated component, for example an FPGA (field-programmable gate array) or an ASIC (application-specific integrated circuit). In general, the node device 130 comprises electronic circuitry configured for implementing the methods described in relation to FIGS. 4 to 6.

The invention claimed is:

1. A transmission method for transmitting a fragment of an Internet Protocol ("IP") packet from a first node device to a third node device through a second node device belonging to a network neighbourhood of said first and third node devices, said first, second and third node devices belonging to an electrical supply network, said first and second node devices being configured for communicating by powerline and by radio frequency, said second and third node devices being able to communicate with each other only using a single communication medium, referred to as a first communication medium, among the powerline and the radio frequency, wherein said method comprises steps performed by the second node device comprising:

receiving a first fragment sent by said first node device using the first communication medium being either by the powerline or by the radio frequency;

sending an acknowledgement message to said first node device using a second communication medium selected from the powerline and the radio frequency where the second communication medium is selected based on a type of medium of the first communication medium so that the second communication medium is a medium type that is different from said first communication medium; and transmitting said first fragment to said third node device using said first communication medium, wherein fragments of the IP packet following said first fragment are transmitted to said second node device using only said second communication medium.

2. The method according to claim 1, wherein said IP packet is fragmented by an adaptation sub-layer incorporating an IPV6 over Low-Power Wireless Personal Area Networks ("6LoWPAN") protocol.

3. The method according to claim 1, wherein, in the case where at least one fragment of the IP packet is transmitted by the powerline, said at least one fragment is transmitted on at least one frequency band belonging to a set of frequency bands comprising:

a European Committee for Electrotechnical Standardization ("CENELEC") A frequency band;

a CENELEC B frequency band; and a Federal Communications Commission ("FCC") frequency band or an Association of Radio Industries and Businesses ("ARIB") frequency band.

4. The method according to claim 1, wherein, in the case where at least one fragment of the IP packet is transmitted by the radio frequency, said at least one fragment is transmitted on a frequency band ranging from 863 MHz to 870 MHz.

5. An intermediate node device between a first node device and a second node device, said intermediate node device and said first and second node devices belonging to an electrical supply network and said intermediate node device belonging to a network neighbourhood of said first and second node devices, the first node device and said intermediate node being configured for communicating by powerline and by radio frequency, said second node device and said intermediate node device being able to communicate only using a single communication medium, referred to as a first communication medium, from the powerline and the radio frequency, the intermediate node device comprises:

circuitry configured to cause the intermediate node device to perform:

receiving a first fragment sent by said first node device either by the powerline or by the radio frequency; and sending an acknowledgement message to said first node device using a second communication medium selected from the powerline and the radio frequency where the second communication medium is selected based on (1) identifying what type of medium of communication the first communication medium is, and (2) selecting the second communication medium based on the first communication medium used so that the second communication medium is a medium type that is different from said first communication medium;

transmitting said first fragment to said second node device using said first communication medium; and transmitting to said second node device fragments of the IP packet following said first fragment using only said second communication medium.

6. A non-transitory storage medium that stores a computer program comprising instructions for implementing the transmission method according to claim 1, when said program is executed by a processor.

* * * * *